April 26, 1960     D. H. SCHAEFER     2,934,750
COUNTING CIRCUIT
Filed Jan. 21, 1958     4 Sheets-Sheet 2
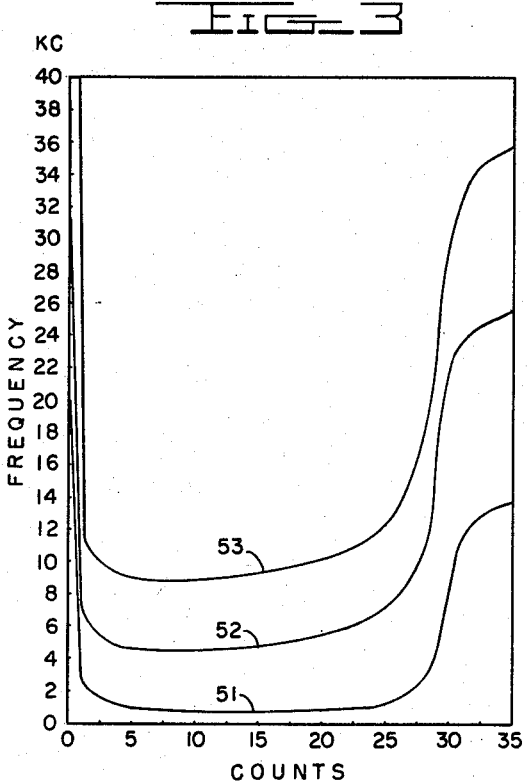
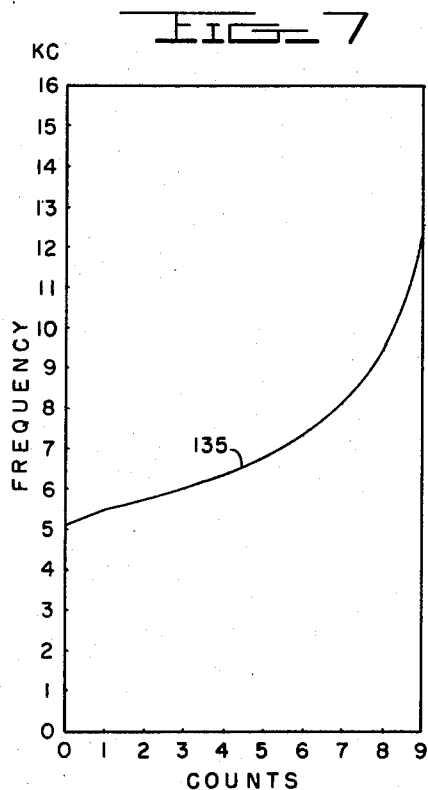
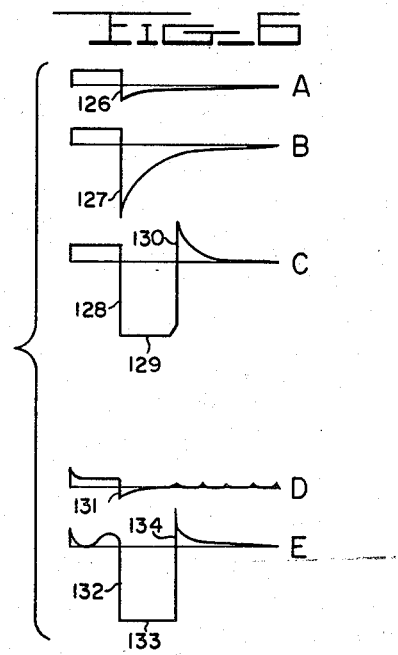
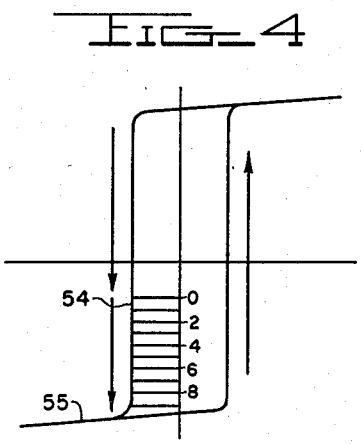
INVENTOR
DAVID H. SCHAEFER
BY
ATTORNEYS April 26, 1960     D. H. SCHAEFER     2,934,750
COUNTING CIRCUIT
Filed Jan. 21, 1958     4 Sheets-Sheet 3

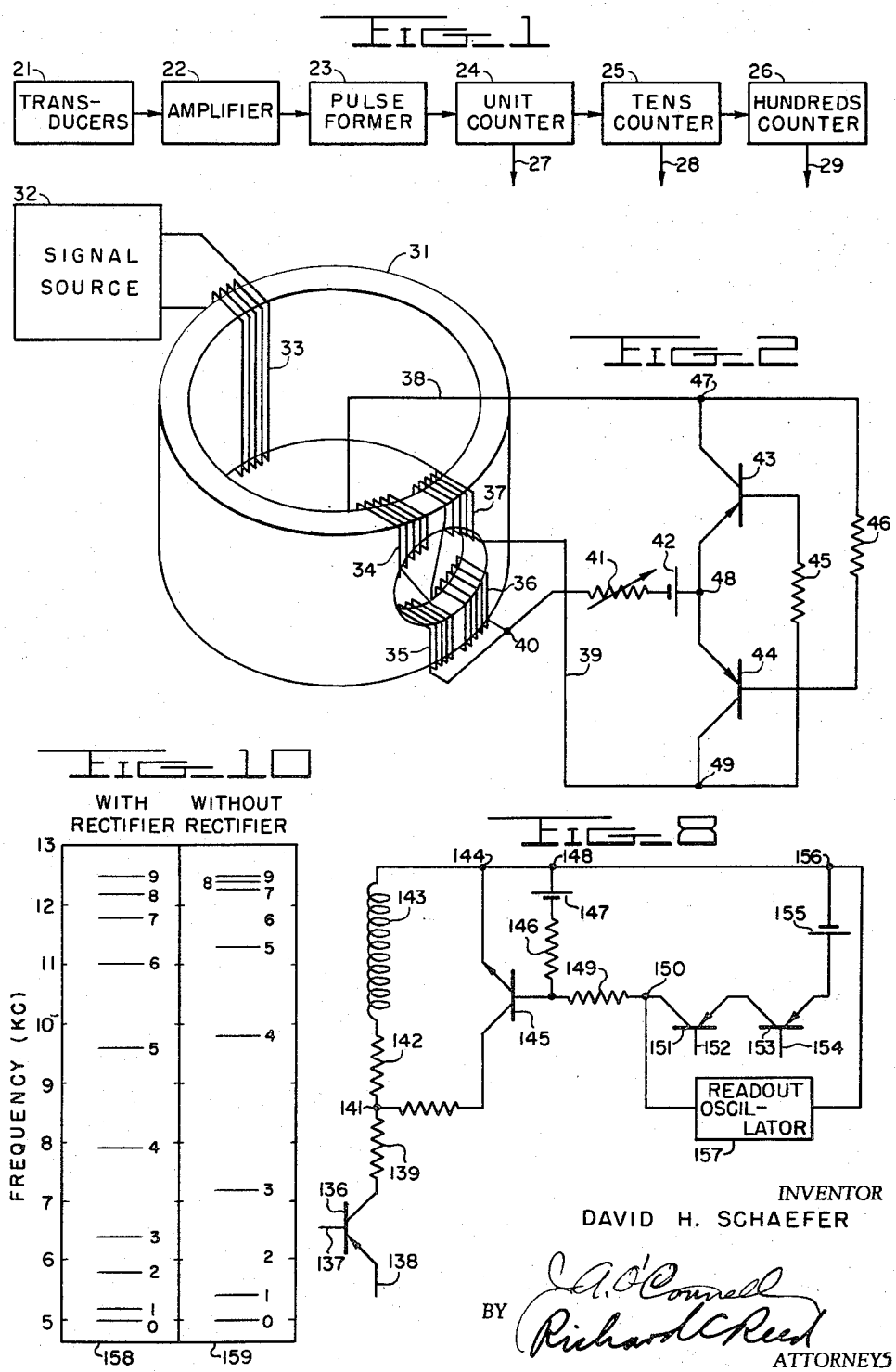

INVENTOR
DAVID H. SCHAEFER
BY
ATTORNEYS

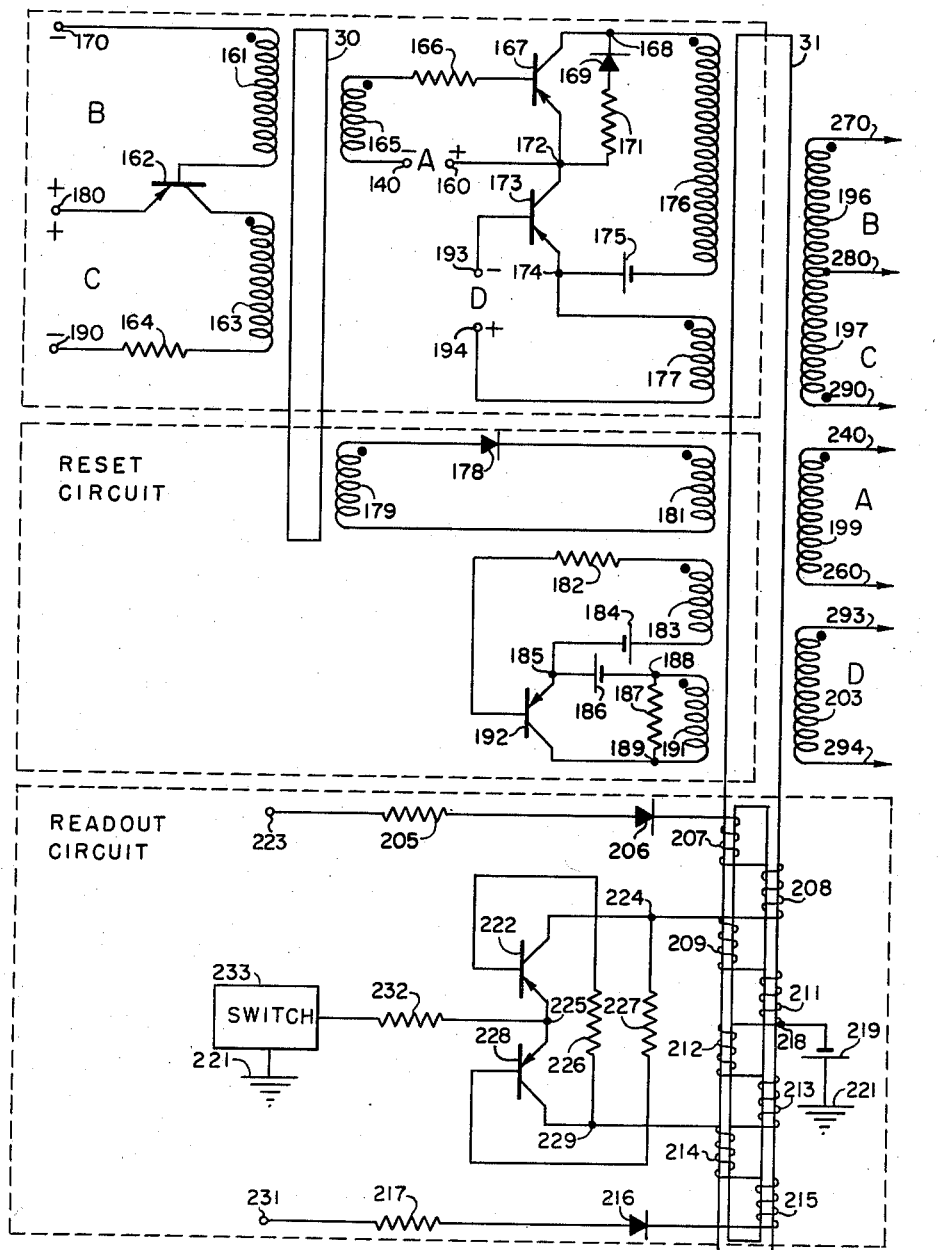

United States Patent Office 2,934,750
Patented Apr. 26, 1960

2,934,750
COUNTING CIRCUIT

David H. Schaefer, Prince Georges County, Md.

Application January 21, 1958, Serial No. 710,379

7 Claims. (Cl. 340—174)

(Granted under Title 35, U.S. Code (1952), sec. 266)

The invention described herein may be manufactured and used by or for the Government of the United States of America for governmental purposes without the payment of any royalties thereon or therefor.

This invention relates to magnetic counting circuits and more particularly to magnetic counting circuits using a particular toroidal magnetic core with an additional hole in the toroid, the axis of the additional hole being disposed so as to coincide with a radius of the toroid, the center of such additional hole being disposed midway between the edges of the cylindrical portion of the toroidal core. This type of configuration is conveniently called a "cyclops."

In the counting circuits available prior to this invention, little consideration was given to the requirements of minimum number of components, minimum power consumption and long, dependable operation without maintanance. Nor was consideration given to the maximum effective use of magnetic cores in a counter circuit nor the provision of limiting the weight of the assembled components to a minimum. Also, in the prior art circuits, no consideration was given to providing an output in which the frequency was representative of the counts.

In the counting circuit of this invention a "cyclops" magnetic core has been used as a memory device and transistors have been included to assure minimum power consumption during long periods of dependable operation under circumstances where maintenance is either unlikely or impossible, such as encountered in an unmanned artificial earth satellite. A more conventional magnetic core has been used in such a manner as to limit the operation of the "cyclops" core so as to traverse only the maximum effective range of the hysteresis loop.

It is therefore, an object of this invention to provide a counting circuit with minimum power consumption requirements.

Another object is to provide a counter circuit composed of a minimum number of components.

Another object is to provide a counter circuit which will operate for a long time with a minimum of maintenance.

A further object of this invention is the provision of a counter circuit which utilizes only that portion of the hysteresis loop of a magnetic core which provides maximum effectiveness.

Still another object of this invention is to provide a counter circuit of minimum weight.

A final object of this invention is to provide a counter circuit in which the counts are represented by an output frequency.

With these and other objects in view, as will hereinafter more fully appear, and which will be more particularly pointed out in the appended claims, reference is now made to the following description taken in connection with the accompanying drawings in which:

Fig. 1 is a showing in block form of a typical counter circuit arrangement.

Fig. 2 is a schematic diagram of a cyclops core used as an element in a circuit in which the frequency is controlled by a signal source.

Fig. 3 is a graphic representation of the frequency of the read-out oscillator output versus the number in input voltage pulses applied to a cyclops core.

Fig. 4 is a graphic representation of the hysteresis loop of the cyclops core used in this invention.

Fig. 6 is a graphic representation of the waveforms across any winding on the cyclops core in the circuits of Figs. 5 and 9.

Fig. 7 is a graphic representation of typical magnetic counter output frequencies.

Fig. 8 is a schematic showing of an oscillator compensating circuit used with the counter circuit of this invention.

Fig. 9 is a schematic diagram of a second modification of the circuit of this invention.

Fig. 10 is a graphic representation of the effect on the output frequency of the magnetic counter circuit of adding a rectifier such as 169 in Fig. 9.

Figure 5:
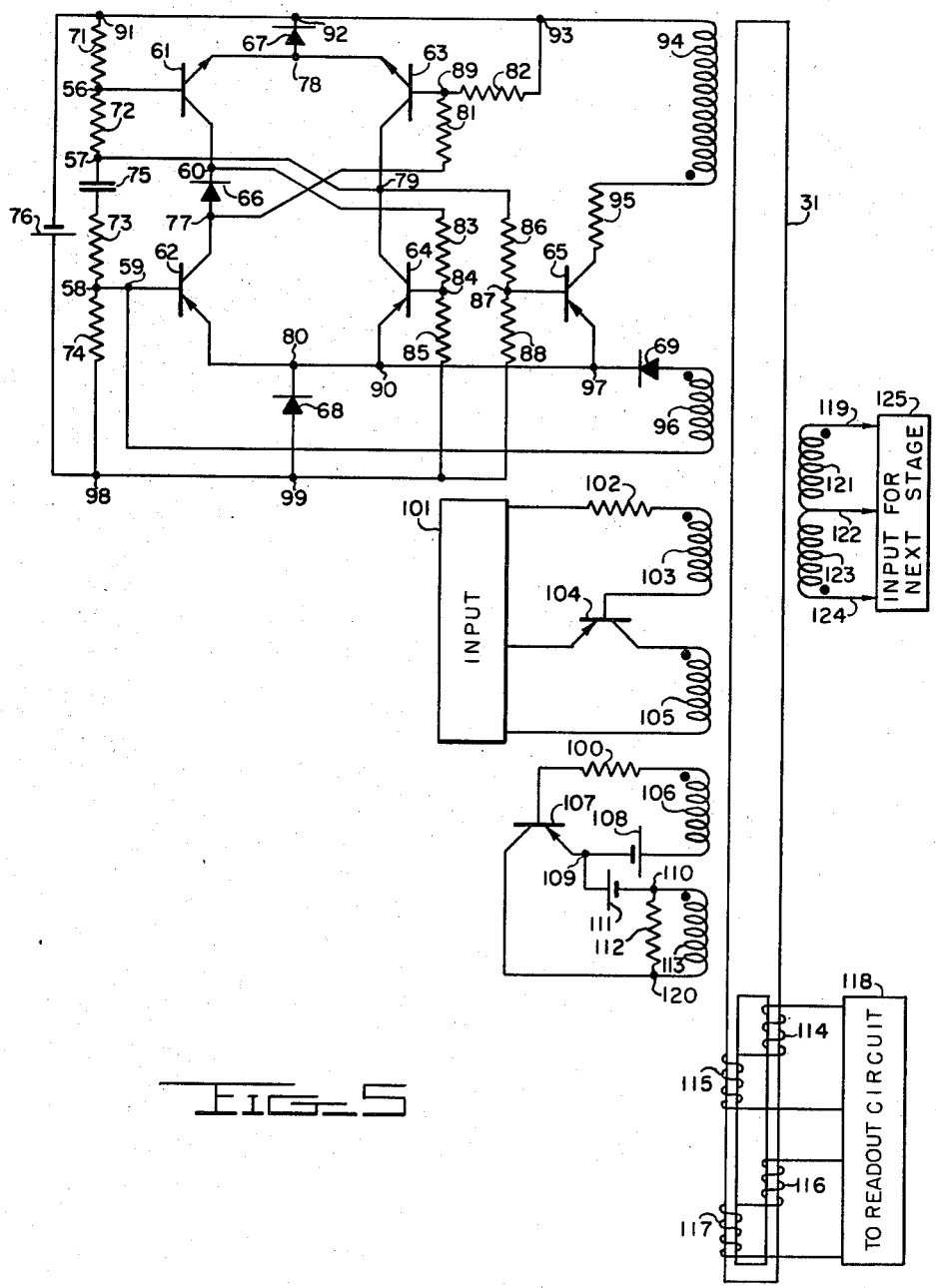
Fig. 5 is a schematic representation of a first modification of the circuit of this invention.

The counting circuit of this invention uses square hysteresis loop magnetic cores in which an additional hole is in the toroid, the axis of the additional hole is disposed so as to coincide with a radius of the toroid. This core has been termed a "cyclops" core and will be referred to as such without quotes in this disclosure. Cyclops cores, like other square hysteresis loop magnetic cores, have the property of absorbing and retaining a fixed number of volt-seconds applied to the windings on the core while the flux saturation in the core is changed from saturation in one direction and saturation in the other direction. Such cores retain their flux level even after the magnetomotive force is removed. When an oscillator is provided with its driving windings wound on the small hole as in Fig. 2, the frequency of the oscillator is indicative of the flux level of the cyclops core, or indicative of the number of input pulses applied from the signal source. It has been discovered that the frequency of the oscillator responds more readily to input signals when the flux alignment of the cyclops core is approaching saturation in either direction. The relationship of the changes in the flux alignment to frequency changes is shown in Fig. 3. This property is utilized in the counter circuit of this invention since only the portion of the hysteresis curve near the level of flux saturation is used. This portion is illustrated in Fig. 7. In one embodiment, that of Fig. 5, the flux alignment of the cyclops core is reset from a saturation which represents the tenth count all the way to the other saturation and then is preset to a level called "zero" which is just far enough away from the first level of saturation to absorb the ten volt-second pulses that are applied thereto. In the modification of Fig. 9, instead of traversing the entire hysteresis loop of the cyclops core, the flux alignment is arrested at the preset "zero" level so as to be ready immediately for the receipt of the first of the next ten pulses, the tenth such pulse being such that saturation is reached and the cyclops core is reset directly to "zero." The reset to "zero" is assured by the use of a conventional tape wound magnetic core of square-loop hysteresis characteristics so selected that, in its traverse of its hysteresis curve from saturation to saturation, it is capable of inducing in the cyclops core the exact number of volt-seconds to traverse the portion of its hysteresis loop that represents ten input counts.

The cyclops core further contributes to the principles of operation of the counting circuit of this invention wherein a series connected symmetrically disposed even number of windings on the edges of the additional hole is used to control the frequency of an oscillator in the read-out circuit. Since the symmetry of the series connected windings induces effectively no volt-seconds to alter the flux alignment of the cyclops core, the read-out circuit can operate constantly for continuous monitoring of the number of counts applied to the cyclops core. With the additional hole in the side of the cyclops and the criss-cross windings thereon as shown in Fig. 2, the flux path is virtually entirely around the additional hole with very little effect on the flux alignment in the rest of the core. Should the read-out circuit be turned on or off during the time the preset current is actually being applied to the core in the circuit of Fig. 5, the oscillator current will increase the amount of preset as many as four counts. A simple shunting circuit as seen in Fig. 8 is provided that decreases the amount of current flow in windings which are coupled to the cyclops core.

The circuit of this invention uses the kickback from saturation of the cyclops core to furnish the pulse for initiating the reset operation and also for furnishing the input pulse to the next counter, the tens counter for example, which changes the flux level of the cyclops core of the tens counter to be representative of one more count.

Fig. 1 shows that in a typical connection of elements, the outputs of transducers 21 are applied through amplifier 22 and pulse former 23 to unit counter 24 which is discernible in its output 27. Upon the tenth input pulse received by the units counter, the units counter resets and the tens counter 25 receives one count which is discernible in its output 28 and so on for the hundreds counter 26 with its output 29.

Fig. 2 shows the cyclops core 31 with a control winding 33 thereon which is connected to a signal source 32. In the crisscross winding on the cyclops, windings 34, 35, 36 and 37 are in series with center tap 40 thereof connected through variable resistor 41 to the negative side of power source 42. The positive side of power source 42 is connected to junction 48 to which are connected the emitters of p-n-p transistors 43 and 44. The collector of transistor 43 is connected through junction 47 and lead 38 to winding 34 and through resistor 46 to the base of transistor 44. The collector of transistor 44 is connected through junction 49 and lead 39 to winding 37 and through resistor 45 to the base of transistor 43.

In Fig. 3, the frequency of the oscillator such as shown in Fig. 2 is plotted against the number of input voltage pulses for a cyclops core. Curve 51 illustrates the response to an oscillator current of 5 milliamperes, curve 52 shows the effect of a 1.9 milliampere oscillator current while curve 53 shows the effect of a 1.1 milliampere oscillator current.

Fig. 4 shows an idealized hysteresis loop of the cyclops core with representations 54 of the flux alignment saturation in response to the input pulses to be counted. The arrows indicate the direction around the hysteresis loop that is used in the operation of the circuits of this invention. It is to be noted that the portion of the hysteresis loop that is actually used, that is from the zero line of scale 54 to saturation 55, leaves a large unused portion. To eliminate this time loss, it is only necessary to limit the traverse of the hysteresis loop from the zero line of scale 54 through saturation 55 and back to the said zero line.

In the complete counting circuit of Fig. 5, which is typical of the counters designated as 24, 25 and 26 in Fig. 1, the cyclops core 31 has windings 94 and 96, in the limited hysteresis loop counting circuit, windings 103 and 105 of the input circuit, windings 106 and 113 of the reset circuit, crisscross windings 114, 115, 116 and 117 of the read-out circuit and windings 121 and 123 of the output circuit.

The counting circuit of Fig. 5 which includes the use of limited hysteresis loop, includes a power source 76, the negative side of which is connected to the not dotted end of winding 94 through junctions 91, 92 and 94. Junction 91 is connected to the positive side of power source 76 through current limiting resistor 71, junction 56, current limiting resistor 72, junction 57, capacitor 75, current limiting resistor 73, junction 58, current limiting resistor 74 and junction 98. Junction 92 is connected to the positive side of the power source 76 through unidirectional element 67, junction 78, n-p-n transistor 61, junction 60, resistor 83, junction 84, resistor 85 and junctions 99 and 98. Junction 78 is also connected to the positive side of power source 76 through n-p-n transistor 63, junction 79, resistor 86, junction 87, resistor 88 and junctions 99 and 98. Connected between junctions 60 and 99 are unidirectional elements 66 and 68, junctions 77 and 80 and p-n-p transistor 62 and also connected between junctions 60 and 99 are resistors 83 and 85 with junction 84 therebetween. Connected between junctions 79 and 80 are p-n-p transistor 64 and junction 90. The base of transistor 61 is connected to junction 56. The base of transistor 62 is connected to junctions 58 and 59. The base of transistor 63 is connected to junction 93 through junction 89 and resistor 82 and to junction 77 through junction 89 and resistor 81. Junction 79 is connected to junction 57 and to junction 99 through resistor 86, junction 87 and resistor 88. The base of transistor 64 is connected to junction 84. Between junctions 90 and 59 are connected junction 97, unidirectional element 69 and winding 96. Connected between junction 97 and the dotted end of winding p-n-p are transistor 65 and resistor 95.

The input circuit includes input 101 with winding 103 connected thereto through resistor 102 at the dotted end and the base of p-n-p transistor 104 at the not dotted end and with winding 105 with the collector of transistor 104 connected at the dotted end thereof.

The reset circuit includes windings 106 and 113 which are connected together through resistor 100 and transistor 107. Also connected between the two windings are the two power sources 108 and 111. Shunted across winding 113 is resistor 112.

The input means to the next stage, the tens counter, for example, is a voltage drop derived across windings 121 and 123 and such input is available through leads 119, 122 and 124.

The output of the counter circuit of Fig. 5 is in the form of a read-out circuit 118 which is coupled to the material around the small hole in the cyclops core by series connected crisscross windings 114, 115, 116 and 117.

The circuit of Fig. 8 is the compensating circuit which is added to the circuit of Fig. 5 to compensate for the effects of the cutting on of the read-out circuit during the operation of the reset circuit. It is to be noted that winding 143 of Fig. 8 is the same winding as 94 in Fig. 5. Resistor 95 of Fig. 5 appears as center tapped resistor 142 and 139 with center tap 141 in Fig. 8. Transistors 136 and 65 are identical. Collector 138 is connected to junction 97 and base 137 is connected to junction 87. The added elements of structure are n-p-n transistor 145, resistors 146 and 149, power sources 147 and 155 and p-n-p transistors 151 and 153. Base 152 of transistor 151 is connected to either of a pair of control means that determine the time of operation of the counter circuit. Base 154 of transistor 153 is connected to the other one of said pair. During such time that the two selecting means render the counter operative, the read-out circuit is completely isolated from the counter circuit and, therefore, has no detrimental effect thereon.

Fig. 9 shows the conventional tape wound magnetic core 30 with the input circuit coupled thereto. The input circuit includes windings 161 and 163 with p-n-p transistor 162 connected therebetween, and terminals for the receipt of input signals B and C from the preceding stage, or from a pulse shaper such as 23 in Fig. 1 should this be the first stage. Coupled thereto is winding 165 which is connected to the base of p-n-p transistor 167 through resistor 166 and to unidirectional element 169 through resistor 171 and junction 172 when a properly polarized input pulse A is applied across terminals 140 and 160. The emitter of transistor 167 is connected through junction 172 to p-n-p transistor 73, and the collector of transistor 167 is connected through junction 168, winding 176, power source 175 and junction 174 to the collector of transistor 173. The base of transistor 173 is connected to junction 174 through winding 177 when input pulse D is properly polarized across terminals 193 and 194.

The reset circuit includes winding 179 on core 30, unidirectional element 178, and winding 181 on cyclops core 31, and identical structure to the reset circuit of Fig. 5.

The read-out circuit of Fig. 9 is identical with the oscillator circuit shown in Fig. 2 with extra windings 207, 208, 214 and 215 on the edges of the small hole so as to provide outputs across terminals 223 and 231. The unidirectional elements 206 and 216 are provided in the output to prevent the outputs of other stages from being applied to the cyclops core in the event that the outputs of several stages are connected together. The switch 233 is provided so that the readout circuit can be turned on and off at will. The inputs necessary to operate the next stage of the counter circuit are derived from windings 196, 197, 199 and 203. The terminals are connected to like lettered inputs in the next stage.

In the operation of the counter circuits of this invention, attention is first directed to Fig. 2 in which the principle of operation is illustrated. The flux level of the cyclops core 31 is changed by the application of input volt-second pulses from signal source 32 through winding 33. The flux level of the cyclops controls the frequency of operation of the oscillator coupled thereto by the series connected windings with each successive winding around the hole being wound in the reverse direction from the winding of the adjacent windings. The variable resistor 41 is provided whereby the basic frequency of the oscillator can be adjusted.

The circuit of Fig. 5 shows the same principle of operation that is illustrated in Fig. 2 with the added features to provide counting action. The input signal source 101 applies unidirectional changes of flux alignment in the cyclops due to the presence of the transistor 104. When the center input to the emitter of transistor 104 is positive, and the two outside inputs are negative, transistor 104 will conduct and a volt-second pulse will be applied to the cyclops core through windings 103 and 105. Reverse polarities will render the transistor 104 non-conductive and no signal is applied to the cyclops core. Usually the magnitudes of the inputs is different, however, inputs of the same magnitude will operate the input circuit and the two outside input leads as shown in Fig. 5 can be connected together.

When the windings of the oscillator of the read-out circuit are wired as in Figs. 2 and 5, the oscillator has a frequency of oscillation which is a measure of the flux level of the core, as illustrated in Fig. 3. The core is first saturated in one direction and then constant volt-second pulses are applied to drive the core to the opposite direction. The three curves show frequency versus count for three different values of oscillator current, this current being adjusted by changes of the variable resistor 41 of Fig. 2. It can be seen that the first pulse applied introduces a very large frequency change. The explanation for this is that this pulse drives the core firmly out of its saturated condition. The following pulses pull the core further away from its initial saturation, the point of zero flux density appearing to be reached at about count ten. From there on the flux level increases as the core proceeds toward saturation in the opposite direction. At count twenty-eight and twenty-nine, signals existing in the circuit show that the knee of the hysteresis loop has been reached.

Reference to Fig. 3 shows that it is impossible to use the complete hysteresis loop of a "cyclops" core for counter purposes. If the whole loop is traversed in a counting cycle, it is impossible to discriminate frequency-wise between early counts and late ones. Furthermore, there is no frequency indication at all of increasing counts when the core is near zero flux level. Fig. 3 shows that the most nearly linear region of the frequency versus count curve is the ascending portion of the curve. It is therefore necessary to set the core to a predetermined point on the ascending portion of the curve, and use the section of the curve between this point and saturation for counter purposes. It should be recalled that not only must a counter stage provide an unambiguous readout of the count in the core, but it must also provide a voltage pulse to the following stage and reset itself upon receipt of the tenth pulse. The operating sequence of a decimal counter will be described in terms of the hysteresis loop shown in Fig. 4. Arbitrarily assume the flux level to be at point O. Fixed volt-second input pulses change the flux level toward negative saturation in fixed increments as shown. Associated with each such input pulse is a voltage kickback upon termination of each input pulse. Magnitude of this voltage kickback becomes greatly increased when pulses are applied after reaching the knee of the hysteresis loop, and this increased kickback voltage initiates operation of the reset circuitry to return the flux level to positive saturation. At positive saturation the reset circuit is disabled and a voltage kickback at saturation provides an initiating signal to a preset circuit which returns the flux to point O to start a new counting sequence. Voltage appearing across an output winding during reset is used to advance the next stage one count. Circuitry that will reset the core and provide a voltage pulse to a following stage is first described. This will be followed by a description of preset circuitry needed to provide an unambiguous read-out.

The circuitry used to reset a core and simultaneously provide a voltage pulse to advance the next digit counter one count is shown in Fig. 5. To understand the operation of this circuitry, first assume the core to be at point O of Fig. 4. Pulses are injected into both base and collector circuits of transistor 104 of Fig. 5. The sense of the windings are so arranged that each pulse will tend to drive the core toward negative saturation. The kickback produced when the voltage is removed by early pulses (when the core is in an unsaturated condition) is of a small value, as shown in line A of Fig. 6. As the core enters negative saturation, the magnitude of the kickback suddenly increases, as shown in line B of Fig. 6. The number of turns in the windings in the base circuit of transistor 107 and the bias voltage are so arranged that the large saturation kickback voltage of a count such as in line B of Fig. 6 will override the base bias battery of transistor 107 and put the transistor into a conducting state. When this happens, the collector circuit battery voltage appears across the winding in the collector circuit. This voltage is in turn transformed to the base windings which puts the transistor even more fully into the conducting state and holds it in this state even after the initiating kickback voltage has disappeared. The battery voltage is applied to the core in such a polarity as to take the core from the negative saturation at which it just arrived back to positive saturation. The regenerative action set up will continue to hold transistor 107 in its conducting state until the core goes into positive saturation. As the core goes into saturation, the voltage across the base windings drops below that of the base bias battery sharply cutting off the battery voltage, and the core will be left at positive saturation. During the reset, the reset battery voltage is impressed across the windings. This reset voltage pulse is large compared to the incoming pulses of opposite polarity, and always contains a given number of volt-seconds. This pulse is therefore available as an input to the following stage. A reset pulse along with its initiating pulse is shown in line C of Fig. 6.

The reset circuit has left the core at positive saturation. It is now necessary to put a given amount of "preset" into the core before counting again begins, if unambiguous frequency indication of counts is to be available. The circuitry to be described allows a fixed current to preset the core to the proper flux level.

The trigger used to activate the current preset circuitry is the positive kickback generated when the reset voltage is cut off as the core enters positive saturation. The magnitude of this kickback is greater than the input pulses as can be seen in line C of Fig. 6. The circuitry used to provide this current preset is shown at the top of Fig. 5. The circuit is a complementary transistor monostable multivibrator. Due to the amplitude discriminating ability of the silicon diode 69 in series with winding 46, only the large positive kickback voltage generated upon removal of the reset voltage is accepted as a trigger. This trigger signal applied to the base of the input transistor 62 trips the multivibrator causing the output transistor 63 to conduct. It is held in this state after the trigger signal disappears by the voltage across the tantalitic condenser 75. The output transistor 63 is included primarily for decoupling purposes. The action of this circuit is to allow a fixed current to flow through core winding 94, in Fig. 5, for a time greater than a fifth of a second. With times in this order of magnitude, the duration of the pulse does not affect the amount of preset applied to the core—the current magnitude alone being the determining factor. Using this preset current, the portion of the curve between counts 20 and 29 of Fig. 3 is utilized. Fig. 7 is a plot of frequency versus counts for the system with voltage reset and current preset. Here the oscillator is drawing 1.9 milliamperes current, and the frequency range is from 5 to 12.5 kilocycles.

In a complete telemetering system, read-out oscillators will be turned on by the telemetering commutator only when their signal is to be transmitted. A single oscillator will be on, therefore, only a small fraction of the total time. The effect of the oscillator being in operation is negligible except when the preset current is actually being applied to the core. During this time, oscillator current will increase the amount of preset. This effect is appreciable and deprives the core of as many as four counts. A simple shunting circuit has been provided that decreases the amount of current flow when the read-out oscillator is on. Fig. 8 is a diagram of this shunting circuit.

The circuitry has been operated up to fifty degrees centigrade. The primary effect that must be compensated for is a widening of the hysteresis loop with increasing temperature. Because of this, the amount of current set must be increased as temperature increases. By replacing the resistors of Fig. 8 with thermistors, compensation can be provided so that the proper frequency range will be covered and every tenth count will reset the core. Temperature calibration is also provided.

Continuous battery drain is on the order of one milliampere for the complete three decimal digit magnetic counter system. When the cores are actually accepting pulses, much greater current is drawn. The duty cycle for the larger drains is, however, negligible being one millisecond of drain for each count.

In the modification shown in Fig. 9 is found one complete stage of counter circuitry. Core 30 is a standard square-loop core while core 31 is a cyclops. In the circuit all transistors are used only as switches. They are in either a fully conducting or a fully cut-off state at all times. The input circuitry of Fig. 9 forms the nine small pulses followed by the large tenth one. At the end of ten counts, the reset circuitry resets the cyclops core to point O of Fig. 4, completely resets core 30, and also in the process provides the input voltages for the next stage. The readout circuitry is the circuitry shown in Fig. 2, with additions to be described later.

In the input circuitry shown in Fig. 9 voltages A and D are the square wave voltage inputs from the pulse former or preceding stage. In actuality, the spaces indicated by A and D are filled by windings on the pulse former core or the cyclops of the preceding stage. The voltage across winding 165 is a voltage from the preceding stage that is transformed through a saturable square-loop core (core 30). For counts one through nine, the voltages A, D and across winding 165 are all present and in the polarities shown. The voltage across winding 165 has a magnitude somewhat greater than A. Therefore, during the time all three voltages are present and of the polarities indicated, transistor 173 will fully conduct while transistor 167 will be in its cut-off condition. The battery 175 is therefore impressed across the cyclops core 31 after undergoing a drop across the silicon rectifier 169 and the resistor 171. Upon receipt of the tenth voltage input pulse, the core 30 that has been transforming the voltage across winding 165 is saturated. Therefore no transformer action takes place making the voltage drop across winding 165 zero, while A and D are still present. Thus, both transistors 167 and 173 now become fully conducting and the battery voltage appears across the winding 176 with only negligible drop. This is the mechanism that allows nine small pulses followed by a large tenth one to appear across the cyclops core winding 176.

Fig. 9 shows the complete diagram of the input circuit. Voltages B and C are also input voltages from the preceding stage (or the pulse former). Core 30 is driven just to saturation by nine input pulses and firmly into saturation on the tenth pulse. During this tenth pulse it therefore does not transform any voltage to its secondary winding 165. The windings shown in series with voltages B and D, that is windings 163 and 177, are to prevent a feedback of voltage to a preceding stage during reset of one stage.

The reset circuitry is as shown in the center section of Fig. 9. This portion of the circuit has the job of bringing core 30 from negative saturation (at which the incoming pulses left it) back to positive saturation. At the same time, the cyclops core 31 is returned a small portion of its way back toward positive saturation (to point O of Fig. 4). This is accomplished as follows. A large negative voltage spike is developed across all core windings following the tenth input pulse. So big is this negative spike, in fact, that the battery 184 in the base circuit of transistor 192 is overridden and a negative voltage appears upon the base of the transistor 192. When this happens, the collector-circuit battery 186 voltage of higher potential than battery 184 appears across the windings in the collector circuit. This voltage is in turn transformed to the base winding 183 which puts the transistor 192 even more fully into the conducting state and holds it in this state even after the initiating kickback voltage has disappeared. The battery 186 voltage is applied in such a direction to take both cores back towards positive saturation—core 31 directly, core 30 by coupling through the diode 178. Core 30 is designed to have much less volt-second capacity than core 31. Therefore, core 30 will go into saturation when core 31 has only moved a small part of the way up its hysteresis loop. When core 30 goes into saturation, a short circuit is thrown across both cores due to the coupling. The voltage on the base windings of transistor 192 falls below the voltage required to keep it on and the transistor 192 cuts off. The circuit is now ready to receive more counts as core 30 is at positive saturation and core 31 is at point O of Fig. 4. During the reset a large voltage pulse of negative polarity is developed across all windings. This reset voltage pulse becomes the voltages A, B, C, and D for the following stage from output windings as shown in Fig. 9. Line D in Fig. 6 shows a typical ninth input pulse followed by a small kickback voltage spike. The bottom section of Fig. 6 shows the tenth input pulse followed by the negative reset voltage pulse. The hump on the tenth pulse appears at the time core 30 saturates.

It is apparent that the phenomena of voltage kickback is vital to the operation of the circuit. Kickback voltage spikes are present upon any sudden removal of current from the winding. The amount of this kickback is roughly proportional to the amount of current that is removed. In the counter it is desirable to have the kickback spike of the tenth count much greater than the kickback spikes of any of the other counts. There are two methods of increasing the kickback. One is to simply drive the core 30 further into saturation. The nearer to saturation, the greater the current flow for a given voltage pulse and the greater the kickback. The second method of increasing the kickback is to increase the current by an increase in the applied voltage. In the counter, both methods are used—the large tenth pulse pulling the core well into saturation.

The silicon rectifier 169 in the input circuitry improves the linearity of the count versus frequency curve as shown in Fig. 10. This is explained by the fact that there is a constant voltage drop across the rectifier even though the current flow through it changes. This means that as the core proceeds into saturation it receives a more nearly constant volt-second input than if a resistor alone is used.

Transistor 167 should have a very low voltage drop when in its saturated state. It must also have a very high gain. The reason for this last requirement is that during reset there is a feedback path through the base circuit of transistor 167 to the preceding stage. If current less than magnetizing current of the preceding stage flows, this path does no harm. To keep the current low, resistance must be placed in the base circuit. To overcome the effects of this resistor, a high gain transistor is necessary.

The diode 178 in the circuit coupling the two cores must have only a small forward drop. If the drop is large, reset will continue even after core 30 saturates. This will drive the cyclops into positive saturation rather than leaving it at point O of Fig. 4. A power-type rectifier is used in this application.

Fig. 9 shows the complete read-out circuitry. During the interval that a particular oscillator frequency is to appear across terminals 223 and 231, a gating signal from switch 233 is used to apply oscillator power, turning it on for the proper interval. The output terminals go to a modulator that reshapes the somewhat triangular waves of the oscillator into square waves. The square waves can then modulate a transmitter.

After turn ratios have been determined so that the input voltages are nearly correct values, differences between units can be compensated for by varying the values of resistors 171, 164, 187 and 232 in Fig. 9.

The resistor 164 must first be adjusted so that core 30 saturates near the beginning of the tenth input pulse. This resistance will be of low value. The resistor 187 which determines the maximum value of the voltage kickback spikes is then adjusted so that the tenth count will initiate reset. This value will not be critical. The next step is to adjust resistor 232 so that the zero count will be on the lowest frequency desired. Following this, resistor 171 is adjusted so that the ninth count will fall on the highest desired frequency. There is a certain amount of interaction between the adjustments of resistors 171, 187 and 232 so that a "zeroing in" on the desired calibration is generally necessary.

Temperature has three definite effects on the circuitry. Both high and low temperatures tend to raise the count versus frequency curve. This is caused both by changes in transistor and core characteristics. These changes are not great between room temperature and 50° C. Above 50° C. and below room temperature the effect is undesirable, but perfectly calibratable.

Operation at very high temperatures after making adjustments of the resistors 164, 171 and 187, and at a low temperature may cause the counter to reset on the ninth count. This is caused by the fall in the internal bias of transistor 192. Similarly, if the temperature is lowered after making high temperature adjustments, a point will eventually be reached where eleven counts are required for reset. This is again caused by the change in internal bias of transistor 192. Units have been built that will consistently count to ten and reset over the range from zero centigrade to 80° C.

The weight of a module while includes amplifier, pulse former, and three counter stages weighs 3.1 ounces before potting. After being embedded in potting material, this weight is raised to about five ounces.

The counter itself has zero current drain when no counts are being received. Approximately 15 to 20 milliamperes, on the average, flow for each count, but this flow lasts for only 200 microseconds per pulse. A 1000 milliampere-hour battery would therefore be able to keep the counter counting to over $10^9$ counts.

The read-out oscillators require approximately three milliamperes of current. This, however, is also not a constant drain.

In a typical embodiment of the circuit of Fig. 9, transistors 162, 222 and 228 are type 2N128, while transistors 167, 173 and 192 are type 2N137. The unidirectional element 178 is type 1N270, unidirectional element 169 is type 6001 (Hughes silicon) and unidirectional elements 206 and 216 are type N100. The power sources 174 and 184 produce 1.3 volts and power source 186 produces 4 volts. The magnetic cores are toroidal and are made of fifty percent nickel and fifty percent iron. Core 31 has a size Number 18 hole drilled in one side thereof. For the windings, winding 161 has 15 turns, 163 has 100 turns, 165 has 225 turns, 176 has 100 turns, 177 has 20 turns, 179 has 100 turns, 181 has 300 turns, 183 and 191 have 250 turns, while windings 207, 208, 209, 211 through 215 have 50 turns each and windings 196 through 199 and 203 have 40 windings each. Resistor 164 is variable from zero to 20 ohms, resistor 166 has 1000 ohms resistance, resistor 171 is variable from 30 to 100 ohms, resistor 182 has 200 ohms, resistor 187 is around one kiloohm when a .002 microfarad capacitor is connected parallel thereto. Resistors 205 and 217 are 2 kiloohms of resistance. Resistor 232 is variable from 200 to 1000 ohms.

Obviously many modifications and variations of the present invention are possible in the light of the above teachings. It is therefore to be understood that within the scope of the appended claims the invention may be practiced otherwise than as specifically described.

What is claimed is:

1. In a counting circuit, a magnetic core having square hysteresis loop characteristics, means for presetting a selected degree of saturation in a selected polarity in said core, means for periodically driving said core to saturation in said polarity, means for periodically resetting said core to the selected preset degree of saturation, and means for providing an output signal in dependency on any degree of saturation of the core.

2. In a counting circuit, a magnetic core having square hysteresis loop characteristics, means for presetting a selected degree of saturation in a selected polarity in said core, means for periodically driving said core to saturation in said polarity, means for periodically resetting said core to the selected preset degree of saturation, means for providing an output signal in dependency on any degree of saturation of the core, and means for suppressing extraneous output signals during the resetting of the core.

3. In a counting circuit, a magnetic core having square hysteresis loop characteristics, means for presetting a selected degree of saturation in a selected polarity in said core, means for periodically driving said core to saturation in said polarity, means for periodically resetting said core to the selected preset degree of saturation, means for providing an output signal in dependency on any degree of saturation of the core, and means for suppressing output signals during the resetting of the core, each of said means coupled to said magnetic core.

4. In a counting circuit, first and second magnetic cores, each having square hysteresis loop characteristics, said first and second magnetic cores being coupled together in such a manner that during the change of flux saturation of said first core from one state of saturation to another, the flux saturation of said second core changes from saturation in one polarity to another level of saturation in said one polarity, means for providing an output signal in dependency on the degree of saturation of said second core.

5. In a counting circuit, first and second magnetic cores, each having square hysteresis loop characteristics, said first and second magnetic cores being coupled together in such a manner that during the change of flux saturation of said first core from one polarity of saturation to the other polarity of saturation, the flux saturation of said second core changes from saturation in one polarity to another level of saturation in said one polarity, the changes of flux saturation in one direction being incremental and means for providing an output signal in dependency on the degree of incremental saturation of said second core.

6. In a counting circuit, first and second magnetic cores, each having square hysteresis loop characteristics, said first and second magnetic cores being coupled together in such a manner that during the change of flux alignment of said first core from one polarity of saturation to the other polarity of saturation, the flux saturation of said second core changes from saturation in one polarity to another level of flux alignment in said one polarity, the changes of flux alignment in one direction being incremental, readout means coupled to said second core including a frequency responsive means which is representative of the individual incremental changes of flux alignment in said second core, and means for suppressing output signals during the resetting of the core.

7. In a counting circuit, first and second magnetic cores, each having square hysteresis loop characteristics, said first and second magnetic cores being coupled together in such a manner that during the change of flux alignment of said first core from one polarity of saturation to the other polarity of saturation, the flux saturation of said second core changes from saturation in one polarity to another level of flux alignment in said one polarity, the changes of flux alignment in one direction being incremental, readout means coupled to said second core including a frequency responsive means which is representative of the individual incremental changes of flux alignment in said second core, and pulse forming means responsive to the saturation of said second core to trigger a second counting circuit connected thereto.

References Cited in the file of this patent

UNITED STATES PATENTS

| | | |
|---|---|---|
| 2,792,506 | Torrey | May 14, 1957 |
| 2,803,812 | Rajchman | Aug. 20, 1957 |
| 2,823,348 | Scorgie | Feb. 11, 1958 |
| 2,846,670 | Torrey | Aug. 5, 1958 |